US012520836B2

(12) United States Patent
Nomura

(10) Patent No.: US 12,520,836 B2
(45) Date of Patent: Jan. 13, 2026

(54) ANIMAL REPELLING SYSTEM

(71) Applicant: Nippon RB Development INC., Tokyo (JP)

(72) Inventor: Kenji Nomura, Tokyo (JP)

(73) Assignee: NIPPON RB DEVELOPMENT INC., Tokyo (JP)

( * ) Notice: Subject to any disclaimer, the term of this patent is extended or adjusted under 35 U.S.C. 154(b) by 294 days.

(21) Appl. No.: 18/383,583

(22) Filed: Oct. 25, 2023

(65) Prior Publication Data

US 2024/0172739 A1  May 30, 2024

(30) Foreign Application Priority Data

Oct. 25, 2022 (JP) ................................ 2022-170908

(51) Int. Cl.
*A01M 29/12* (2011.01)
*A01M 29/10* (2011.01)
(Continued)

(52) U.S. Cl.
CPC ............ *A01M 29/12* (2013.01); *A01M 29/10* (2013.01); *A01M 29/16* (2013.01);
(Continued)

(58) Field of Classification Search
CPC ...... A01M 29/12; A01M 29/10; A01M 29/16; A01M 31/002
See application file for complete search history.

(56) References Cited

U.S. PATENT DOCUMENTS

2013/0014285 A1 * 1/2013 Sasakura ................ G06Q 50/01
726/29

FOREIGN PATENT DOCUMENTS

CN 107156102 A * 9/2017 ............ A01M 29/16
JP 7-87875 4/1995
(Continued)

OTHER PUBLICATIONS

KR-102295743-B1 Translation (Year: 2021).*
(Continued)

*Primary Examiner* — Kimberly S Berona
*Assistant Examiner* — Steven J Shur
(74) *Attorney, Agent, or Firm* — WENDEROTH, LIND & PONACK, L.L.P.

(57) ABSTRACT

An animal repelling system having, connected through Internet, an animal repelling device, a user terminal, a professional terminal, an administrative server, an information processing server, and an information disclosure server. The repelling device has an infrared sensor, an infrared camera, a shockwave generator, a strobe flashlight, an odor sensor, a repellency control portion, and a communication. The administrative server has a user-membership information database device, an Information-embedded diagram information database device, a professionals-membership information database device, a user-membership information administrative portion, an Information-embedded diagram information administrative portion, a professionals-membership information administrative portion, and a communication processing portion. The information processing server has an information extraction portion, an information elimination portion, and an information processing portion. The information disclosure server has a disclosed-information database device, a membership type determination portion, and an information disclosure permission portion. Access is in accordance with a membership type.

4 Claims, 10 Drawing Sheets

(51) Int. Cl.
*A01M 29/16* (2011.01)
*A01M 31/00* (2006.01)
*G06V 40/20* (2022.01)
*H04L 9/40* (2022.01)
*H04L 65/403* (2022.01)

(52) U.S. Cl.
CPC ............ *A01M 31/002* (2013.01); *G06V 40/20* (2022.01); *H04L 63/102* (2013.01); *H04L 65/403* (2013.01)

(56) References Cited

FOREIGN PATENT DOCUMENTS

| | | |
|---|---|---|
| JP | 7-255351 | 10/1995 |
| JP | 3059296 | 7/1999 |
| JP | 2001-258465 | 9/2001 |
| JP | 2002-163 | 1/2002 |
| JP | 2003274840 A * | 9/2003 |
| JP | 3490319 | 1/2004 |
| JP | 2004-135525 | 5/2004 |
| JP | 3773199 | 5/2006 |
| JP | 2006-211917 | 8/2006 |
| JP | 2007-192736 | 8/2007 |
| JP | 2007-325504 | 12/2007 |
| JP | 2010-88338 | 4/2010 |
| JP | 3170872 U * | 10/2011 |
| JP | 2011250745 A * | 12/2011 |
| KR | 102295743 B1 * | 8/2021 ............ H02M 3/156 |
| WO | WO-2017006976 A1 * | 1/2017 ............... H04R 1/40 |

OTHER PUBLICATIONS

CN-107156102-A Translation (Year: 2017).*
WO-2017006976-A1 Translation (Year: 2017).*
JP-2011250745-A Translation (Year: 2011).*
JP-3170872-U Translation (Year: 2011).*
JP-2003274840-A Translation (Year: 2003).*

* cited by examiner

[Fig.1]
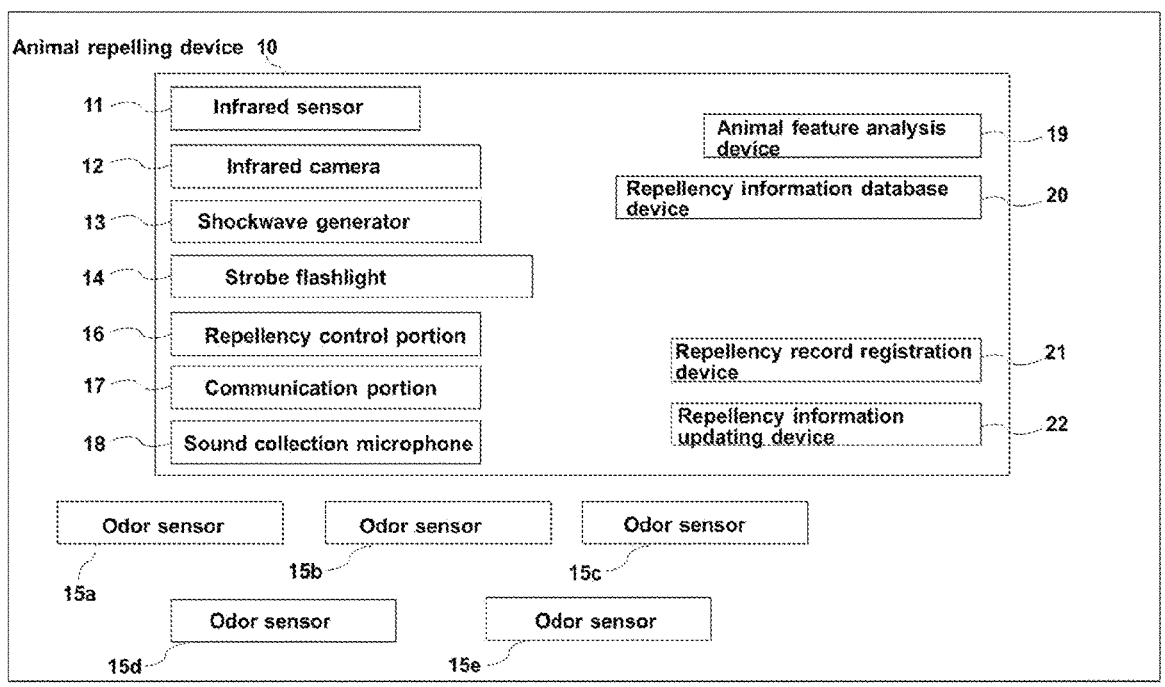

[Fig.2]
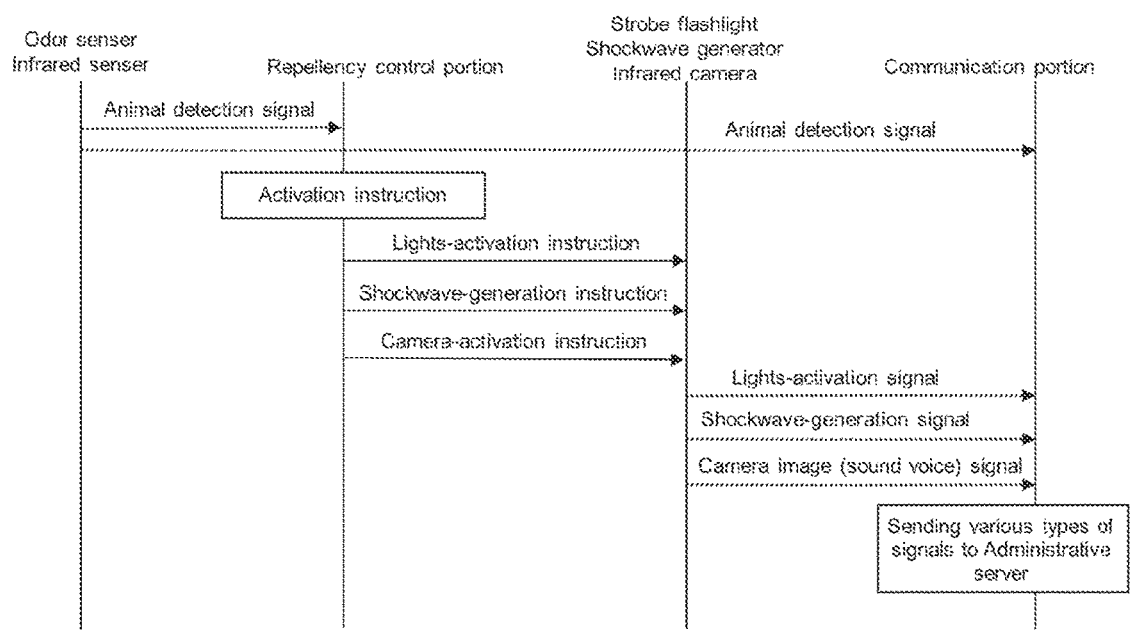

[Fig.3]
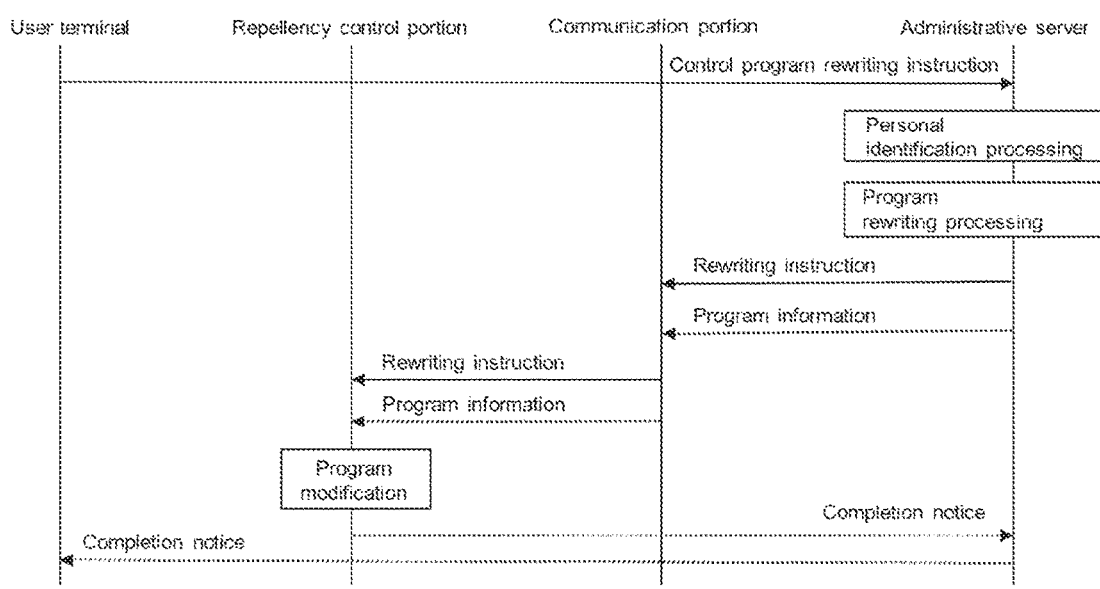

[Fig.4]
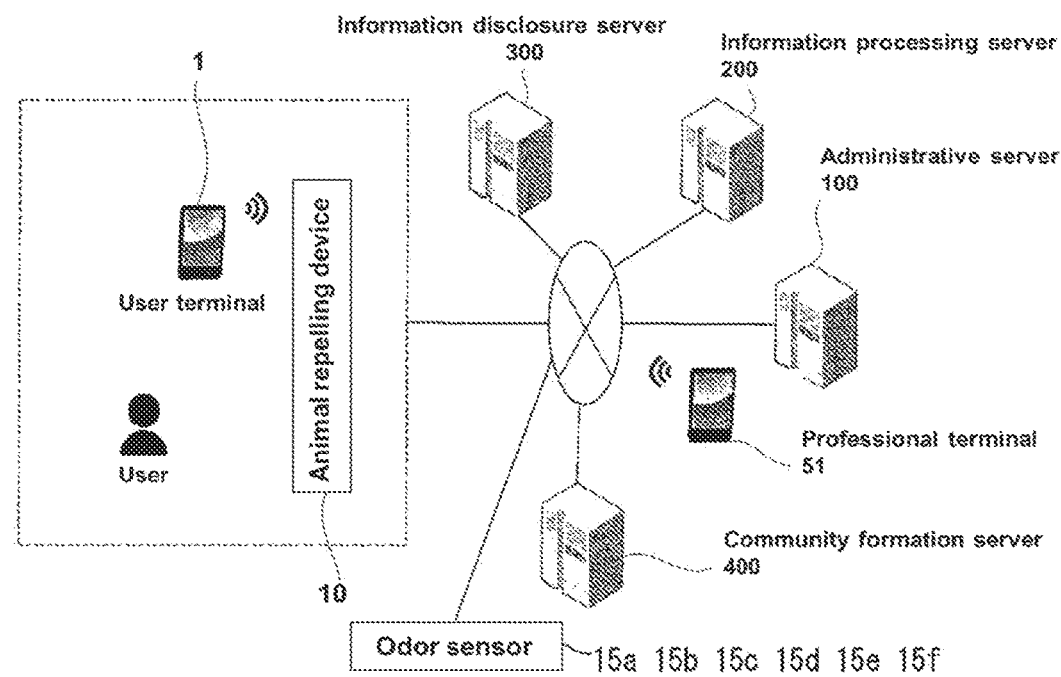

[Fig.5]
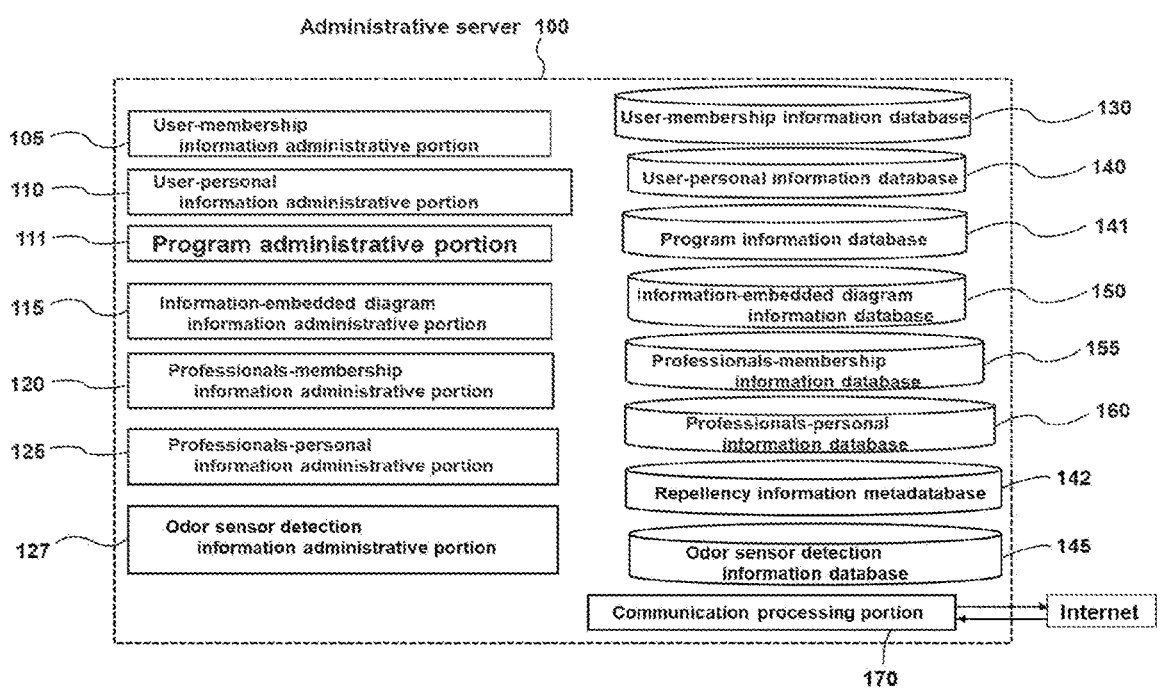

[Fig.6]
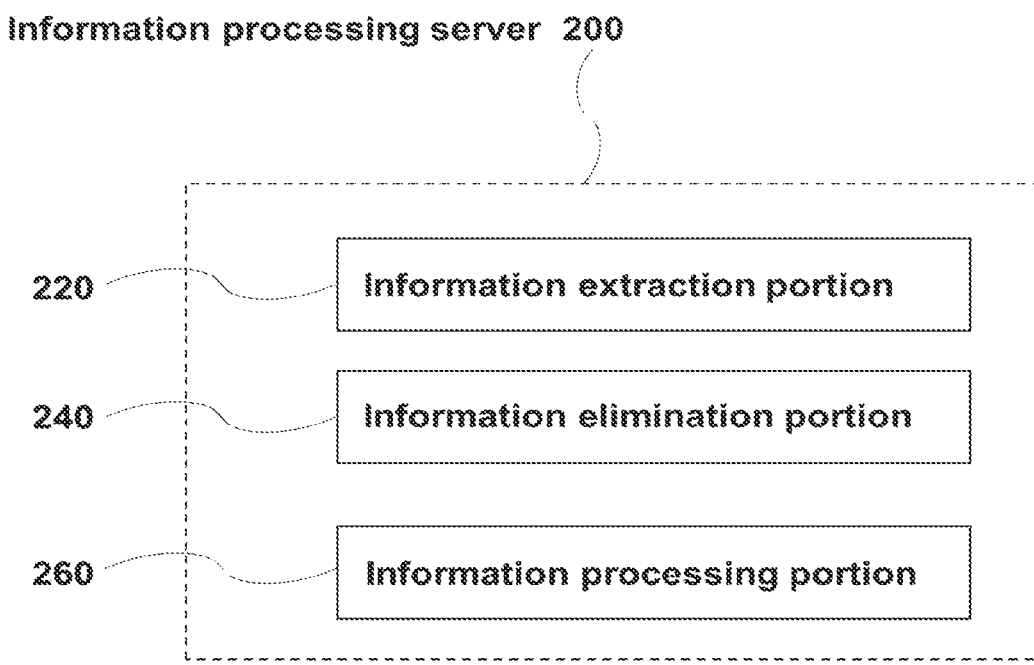

[Fig.7]
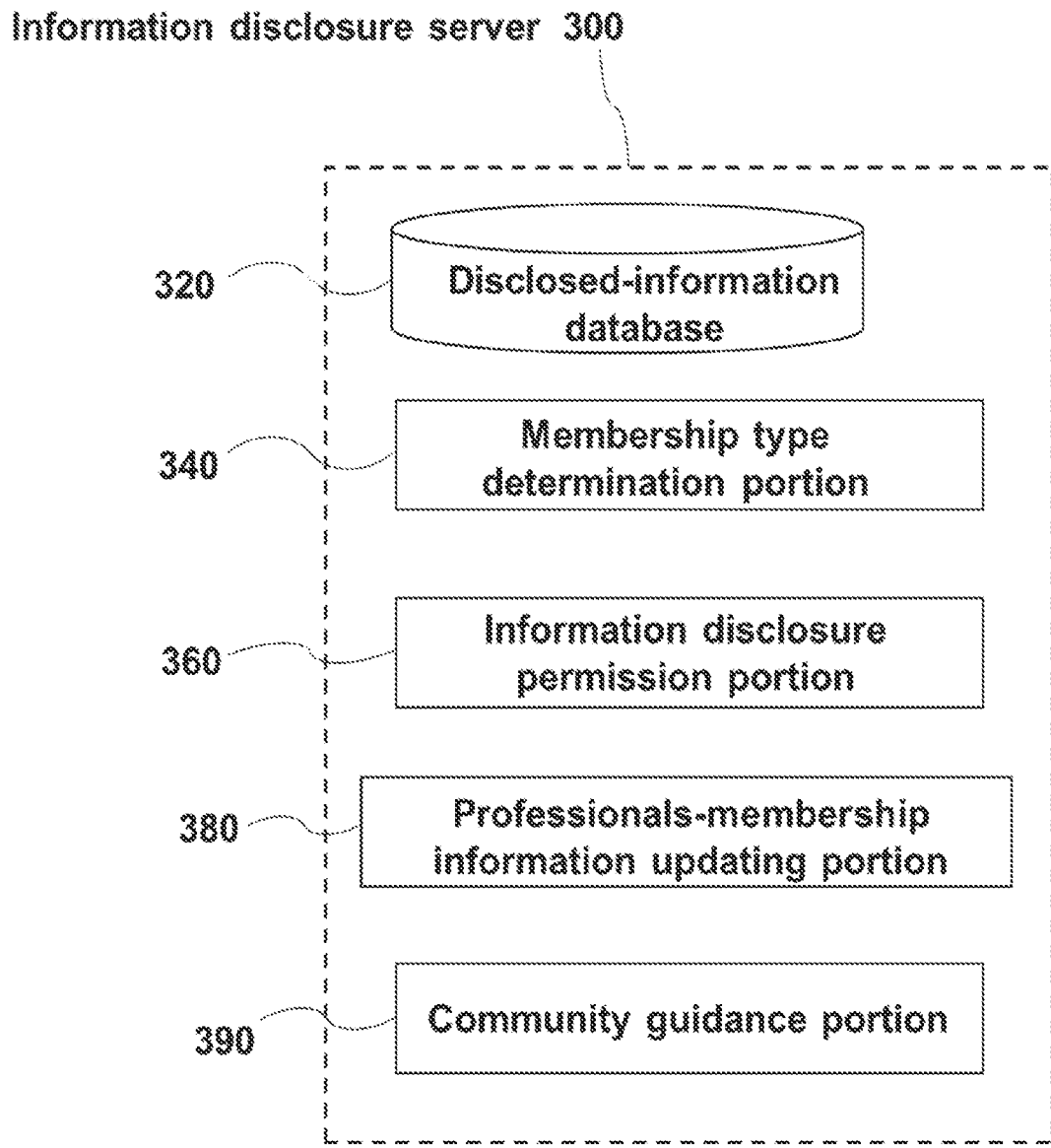

[Fig.8]
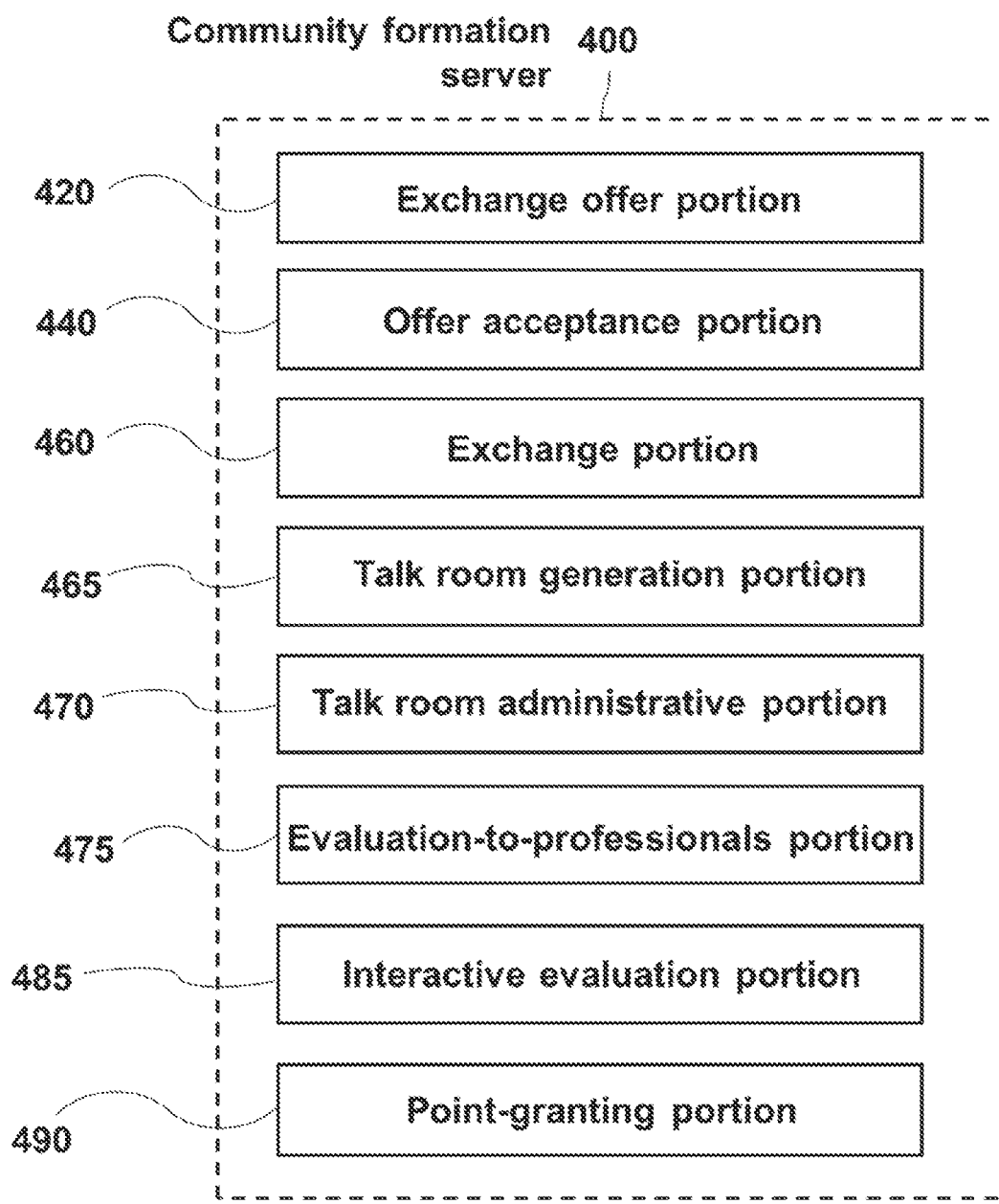

[Fig.9]
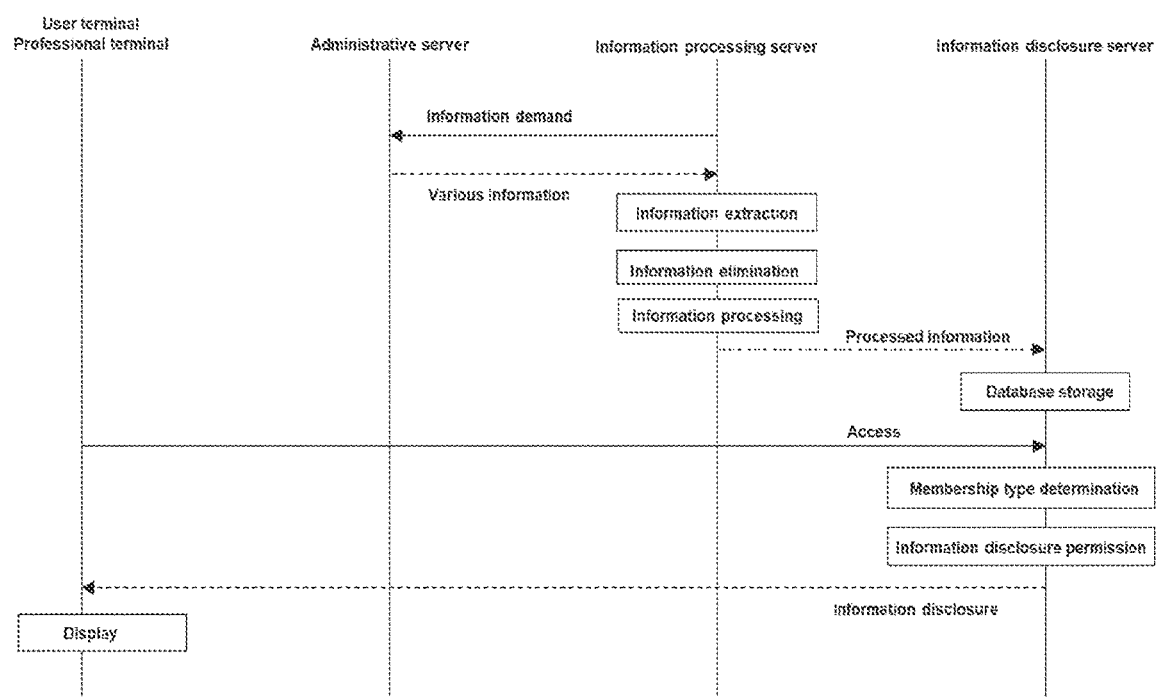

[Fig.10]
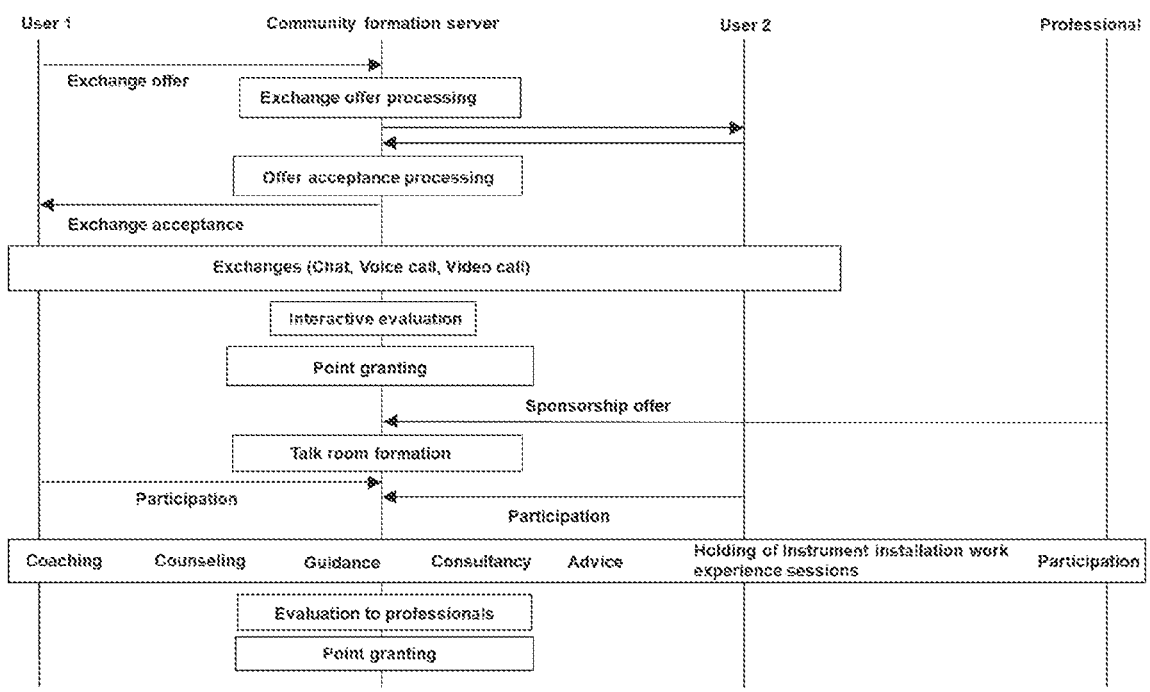

ANIMAL REPELLING SYSTEM

DETAILED DESCRIPTION OF INVENTION

Technical Field

The present invention relates to a system for repelling (driving away) animals, including rats/mice, nutrias, masked palm civets, deer, muntjacs, and raccoon dogs.

BACKGROUND ARTS

Repelling animals means driving them away by surprising them. From the viewpoint of animal protection, a term of "repelling" is used to mean driving them away alive, in the present description.

A device to intimidate animals entering a sandbox is proposed in Patent Document 1. It is configured by combining a detecting device such as a sensor, a switch, provided to a sandbox in a manner such as being erected, buried, suspended, a first intimidating device/ultrasonic emitter using ray means such as a high-power floodlight, a flashlight, a laser, which are activated by the detecting device and at least one unit of which is installed for the sandbox, a third intimidating device/tape which is another emitter and so on, a second intimidating device/shower using a sound generating device such as a radio, broadcasting, a musical instrument, a chime, and besides, a fourth intimidating device to generate jets, spray, and so on.

A system of providing protection against beast/bird-caused damages by making gunpowder burst is proposed in Patent Document 2. It constitutes a burst sound generation device out of a cone-formed cracker connected with a pull string at a tip of its conical shape and accommodating toy gunpowder, a housing case configured to have internally a separation wall provided with a through hole at which the cone-formed cracker inserted into an opening portion through the tip of its conical shape is fixed at its thick-cone part and to have the pull string drawn out through an opening portion on a side opposite thereto, a pull stick comprising a stopper at each of one end portion at which to wrap up the pull string, another end portion comprising a coil spring to pull the pull string in an axial-line direction, and an intermediate portion, and allowed to move in the axial-line direction through two through holes provided to a plunger case, a plunger which so that a claw provided at a tip portion of a lock bar placed perpendicularly to an axial-line direction of the pull stick is detached from a stopper of the pull stick, activates a lock bar against repulsive force of the coil spring in an opposite direction and which is accommodated in the plunger case, and is made to burst, when the plunger is activated by a signal from a control device placed elsewhere, toy gunpowder by a movement, caused by delocking the lock bar, of the pull stick in a direction to a side opposite to the cracker and tension of the pull string entailing this, and to intimidate and eliminate birds and beasts having entered with burst sound and gunpowder smoke smell entailing a burst of the toy gunpowder.

A garbage accommodation box to repel an animal by using ultrasound wave and an infrared sensor is proposed in Patent Document 3. It is a garbage accommodation box comprising a stand and a garbage accommodation portion provided on the stand and having at least its front surface opened, and further comprising a sensor to detect a beast/bird aiming at garbage accommodated inside the garbage accommodation portion and an intimidating device to intimidate a beast/bird on a basis of a detection signal from the sensor, wherein the sensor and the intimidating device are installed on the stand.

A device to monitor a moving body by using an IC tag is proposed in Patent Document 4. It has an IC tag reader having a detection scope which allows a signal containing ID information proper to and emitted by an IC tag had by a moving body to be monitored to be detected at a position at least 300 meters away in a specific direction, and an output means of outputting a fact that the signal has been detected by the IC tag reader, and detects that the moving body mentioned above has come within the detection scope.

A device to repel, by its activation member being activated, an animal is proposed in Patent Document 5. It is an activation device having a pillar, an activation member, an retention mechanism of retaining the activation member, and a detection mechanism linked to the retention mechanism, wherein the retention mechanism is made up of an activation member maintenance member directed in a direction vertical to a ground, an activation member retention member vertical to the activation member maintenance member, and an activation member fixation member to retain an upper portion of the activation member maintenance member, wherein the activation member retention member interposes and retains the activation member maintenance member between itself and the pillar, and which is an activation device, as well as an animal repelling device and an animal repelling system, to activate an activation member when the detection mechanism makes detection.

A device to prevent an animal from approaching by comprising an intimidating portion is proposed in Patent Document 6. An approach prevention device according to the present invention is an approach prevention device to prevent animals such as bird species from approaching, and comprises an image-taking means of taking an image of a predetermined area, a velocity vector detection portion to detect, from a difference between two or more images taken at different times by the image-taking means, a velocity vector at a plurality of points on an image, a maximum velocity extraction portion to extract a maximum value of a velocity from the velocity vectors detected, a velocity determination portion to determine, by comparing a velocity maximum value with a predetermined standard value, whether or not the velocity maximum value is a predetermined standard value or more, an intimidating portion to be activated by an electrical signal to intimidate an animal, and an electrical signal-generating portion to generate, in a case where the velocity maximum value is a predetermined standard value or more, an electrical signal to activate the intimidating portion.

A device to watch a sandbox to prevent it, by using light, sound voice, and water, from being entered by cats and dogs is proposed in Patent Document 7. It repels cats and dogs, by catching them moving in darkness with a far-infrared sensor to turn a light on, give warning with sound voice, jet water, and go on attacks for several seconds with glittering water.

A device to prevent a small animal from entering by using ultrasonic wave and water is proposed in Patent Document 8. It is further provided with a water-releasing means to release water, wherein a control means makes, when a moving body detection means detects a small animal being approaching, an ultrasonic wave output means output ultrasonic wave and simultaneously, a water-releasing means release water.

An electroconductive net to conduct electricity in order to repel an animal is proposed in Patent Document 9. It is an anti-beast electroconductive net obtained by making up a lattice-form net through stranding several synthetic resin-made fibers to form a weft/warp stranded string, arranging several internally wire-having stranded strings made by stranding, in a longitudinal direction of the net, several synthetic resin-made fibers and several wires, and allowing the internally wire-having stranded strings and a battery to be connected through a conductor wire.

An animal intimidating device to repel an animal by using sound, light, gas, liquid, chemicals is proposed in Patent Document 10. It is made of an animal detection means of detecting, by any of a sound including inaudible-region one, a light including invisible-region one, infrared rays emitted by an animal, and pressure, or a combination thereof, the animal being approaching, a signal discernment means of discerning such a detection signal from noises, and an animal intimidating means by a sound including inaudible-region one, a light including invisible-region one, emission from gas, liquid, or chemicals mixed into gas or liquid, or a combination thereof.

An electric shock sheet to repel an animal by shocking it electrically is proposed in Patent Document 11. It is a rodent-extermination electric shock sheet to exterminate rodents by shocking them electrically, wherein the rodent-extermination electric shock sheet has, on its upper surface, first electrodes and second electrodes for applying high voltage provided in a state of being alternately arranged and exposed in a longitudinal direction and a transverse direction, wherein the rodent-extermination electric shock sheet has at least two of its sheets including a first sheet and a second sheet laminated, wherein the first sheet is superposed on the second sheet, and has, on its upper surface, the first electrodes formed and simultaneously a plurality of windows provided, wherein the second sheet has, on its upper surface, the second electrodes formed, and wherein the first sheet and the second sheet are superposed on each other in a manner of the second electrodes being exposed through the windows.

An animal repelling system comprising a speaker, a lamp, a high-voltage power source is proposed in Patent Document 12. It transmits, on detecting a moving body with a camera of an animal monitor/repellency control device, a detection signal and an image to an animal intimidation control server and an information analysis server, specifies an animal included in the image with an animal specification portion with reference to a temperate image database, specifies repellency activation information corresponding to each animal with a repelling method specification portion with reference to a repelling method database, and transmits the repellency activation information to the animal monitor/repellency control device. Thereby, an animal monitor/repellency control device intimidates animals by activating, in accordance with repellency activation information, a speaker, an intimidation lamp, and a high-voltage current generation device.

PRIOR ART DOCUMENTS

Patent Documents

[Patent Document 1] JPH7-255351A
[Patent Document 2] JP3490319B
[Patent Document 3] JP2004-135525A
[Patent Document 4] JP2007-192736A
[Patent Document 5] JP2007-325504A
[Patent Document 6] JP2010-88338A
[Patent Document 7] No. 3059296 Utility Model Granted by JPO
[Patent Document 8] JP2001-258465A
[Patent Document 9] JP2002-163A
[Patent Document 10] JPH7-87875A
[Patent Document 11] JP3773199B
[Patent Document 12] JP2006-211917A

DISCLOSURE OF INVENTION

Problem to be Solved by Invention

Although light, sound, electric shock, or the like is, as described above, used as a means of repelling animals, what to do by using it to allow animals to be effectively repelled can vary as a situation varies, and in some case, a way of doing once built up can be required to be altered. Additionally, it is also necessary to make a system allowing a user who has purchased a device to appropriately evaluate an effect thereof and confirm usefulness thereof. The present invention attempts to provide such an animal repelling system as allows a user to exchange opinions with a professional, control how a device works, and confirm an effect of the device.

Means for Solving Problems

As a result of making earnest researches in view of the above-mentioned problem to be solved, the present inventor has invented ways of solution as shown in following embodiments.

A system according to the present invention
is an animal repelling system made by having, through Internet, an animal repelling device in plurality, a user terminal in plurality, a professional terminal in plurality, an administrative server, an information processing server, and an information disclosure server, connected with each other,
wherein the animal repelling device
has
an infrared sensor to detect a moving animal,
an infrared camera which is activated, as a trigger, by the infrared sensor detecting a moving animal,
and can take an image of an animal moving in darkness,
a sound collection microphone to record a sound given by an animal,
an animal feature analysis device to specify, by analyzing imaging data of the infrared camera and sound voice data of the sound collection microphone, features of an animal, including appearance, size,
sound voice, motion of the animal,
a repellency information database device to relate features of an animal as a result of the animal feature analysis device having made analysis and specification to shockwave data including wavelengths/sound volume of shockwaves suitable for repelling the animal, and light data including frequencies/light amount of light suitable therefor, and store them, and to store them as information including data of what has had an effect and data of what is worthwhile to try,
a shockwave generator to generate, by referring to the repellency information database device on a basis of features of an animal, analyzed and specified by the animal feature analysis device, a shockwave adjusted in wavelength and sound volume on a basis of data of what has had an effect,
a strobe flashlight to generate, by referring to the repellency information database device on a basis of features of an animal, analyzed and specified by the animal feature analysis device, light adjusted in frequency and light amount on a basis of data of what has had an effect, a repellency record registration device to store, by analyzing imaging data of the infrared camera and sound voice data acquired through the sound collection microphone, which are just after the shockwave generator and the strobe flashlight are activated, and determining whether the animal is repelled, a result thereof in the repellency information database device in a case where the animal is repelled, a repellency control portion to generate, by analyzing imaging data of the infrared camera and sound voice data acquired through the sound collection microphone, which are just after the shockwave generator and the strobe flashlight are activated, and determining whether the animal is repelled, and by referring to the repellency information database device on a basis of a result thereof in a case where the animal is not repelled, a shockwave adjusted in wavelength and sound volume in the shockwave generator on a basis of data of what is worthwhile to try, and simultaneously to generate light emitted by the strobe flashlight and adjusted in frequency and light amount, a repellency information updating device to rewrite, in a case where the repellency control portion is activated to thereby succeed in repellency, data in the repellency information database device, on a basis thereof, and a communication portion to execute communication with the Internet, wherein the administrative server has a user-membership information database device to store membership information including a membership type to distinguish a user connected through the user terminal on whether he/she is a prospect customer considering to purchase the animal repelling device or a purchaser having purchased the animal repelling device, a user-personal information database device to store personal information on privacy of a user connected through the user terminal, a program information database device to store information of a program to be embedded in a repellency control portion of the animal repelling device, a repellency information metadatabase device to store data of what has had an effect and data of what is worthwhile to try, stored by a repellency information database device of the animal repelling device, in a relationship with this animal repelling device, an Information-embedded diagram information database device to store information of an Information-embedded diagram given to the animal repelling device purchased or to be purchased by the user, a professionals-membership information database device to store membership information including a membership type of a professional connected through the professional terminal, a professionals-personal information database device to store personal information on privacy of a professional connected through the professional terminal, a user-membership information administrative portion to administer user-membership information and to store it in the user-membership information database device, a user-personal information administrative portion to administer user-personal information and to store it in the user-personal information database device, a program administrative portion to administer a program embedded in a repellency control portion of the animal repelling device purchased by the user as a program group in plurality being allowed to be embedded in this animal repelling device, an Information-embedded diagram information administrative portion to acquire, through the user terminal, information of an Information-embedded diagram given to the animal repelling device purchased or to be purchased by the user and to store it in the Information-embedded diagram information database device, a professionals-membership information administrative portion to administer professionals-membership information and to store it in the professionals-membership information database device, a professionals-personal information administrative portion to administer professionals-personal information and to store it in the professionals-personal information database device, and a communication processing portion to execute communication with the Internet in order to make exchanges between the user terminal in plurality, the professional terminal in plurality, the information processing server, and the information disclosure server, wherein the information processing server has an information extraction portion to extract necessary information out of the user-membership information database device, the user-personal information database device, the program information database device, the repellency information metadatabase device, the Information-embedded diagram information database device, the professionals-membership information database device, the professionals-personal information database device, of the administrative server, an information elimination portion to eliminate personal information or information to be confidential, out of information extracted by the information extraction portion, and an information processing portion to give processing to information obtained by excluding information eliminated by the information elimination portion out of information extracted by the information extraction portion, wherein the information disclosure server has a disclosed-information database device to administer information generated by an information processing portion of the information processing server, for each plurality of levels, a membership type determination portion to determine what kind of membership type the user or the professional, requesting that the information disclosure server disclose information, belongs to, an information disclosure permission portion which permits, on a basis of a result determined by the membership type determination portion, the user or the professional to access information stored by the disclosed-information database device, and simultaneously discloses to the user, information for contacting the professional, in order to allow the user to ask advice of the professional, and a professionals-membership information updating portion to demand, in a case where the user selects information for contacting the professional, disclosed to the user by the information disclosure permission portion and decides to contact this professional, that a professionals-membership information administrative portion of the administrative server rewrite a membership type of this professional into one having a privilege of accessing information of this user, wherein the user terminal displays information disclosed by accessing the information disclosure server in response to a demand of the user, and simultaneously, modifies a program of the repellency control portion or rewrites data of what is worthwhile to try, registered in the repellency information database device, by accessing the animal repelling device used by this user, and wherein the professional terminal displays information disclosed by accessing the information disclosure server in response to a demand of the professional, and allows the user to contact the professional to ask advice thereof, as necessary, with reference to information displayed on the user terminal and allows, by information identical with that on the user terminal of the user being displayed on the professional terminal, the professional to respond with the advice to the user.

This allows a user even to look into a use situation of another user, and additionally to interact with a professional to more effectively alter action of his/her own animal repelling device.

Additionally, a program group in plurality being administered by a program administrative portion of said administrative server includes a program to make, on an occasion of selecting, by referring to said repellency information database device, data of what is worthwhile to try, a random selection out of a plurality of the data of what is worthwhile to try, and a program to, in accordance with an order given in advance to a plurality of the data of what is worthwhile to try, select them sequentially.

This allows a program applied, to have variation.

An animal repelling system made by having, through Internet, an animal repelling device in plurality, a user terminal in plurality, a professional terminal in plurality, an administrative server, an information processing server, an information disclosure server, and an odor sensor in plurality being placed in a placement candidate place of an animal repelling device, which can be a candidate for placing the animal repelling device, connected with each other, wherein the animal repelling device has an infrared sensor to detect a moving animal, an infrared camera which is activated, as a trigger, by the infrared sensor detecting a moving animal, and can take an image of an animal moving in darkness, a sound collection microphone to record a sound given by an animal, an animal feature analysis device to specify, by analyzing imaging data of the infrared camera and sound voice data of the sound collection microphone, features of an animal, including appearance, size, sound voice, motion of the animal, a repellency information database device to relate features of an animal as a result of the animal feature analysis device having made analysis to shockwave data including wavelengths/sound volume of shockwaves suitable for repelling the animal, and light data including frequencies/light amount of light suitable therefor, and store them, and to store them as information including data of what has had an effect and data of what is worthwhile to try, a shockwave generator to generate, by referring to the repellency information database device on a basis of features of an animal, analyzed by the animal feature analysis device, a shockwave adjusted in wavelength and sound volume on a basis of data of what has had an effect, a strobe flashlight to generate, by referring to the repellency information database device on a basis of features of an animal, analyzed by the animal feature analysis device, light adjusted in frequency and light amount on a basis of data of what has had an effect, a repellency record registration device to store, by analyzing imaging data of the infrared camera and sound voice data acquired through the sound collection microphone, which are just after the shockwave generator and the strobe flashlight are activated, and determining whether the animal is repelled, a result thereof in the repellency information database device in a case where the animal is repelled, a repellency control portion to generate, by analyzing imaging data of the infrared camera and detection data of the order sensor, which are just after the shockwave generator and the strobe flashlight are activated, and determining whether the animal is repelled, and by referring to the repellency information database device on a basis of a result thereof in a case where the animal is not repelled, a shockwave adjusted in wavelength and sound volume in the shockwave generator on a basis of data of what is worthwhile to try, and simultaneously to generate light emitted by the strobe flashlight and adjusted in frequency and light amount, a repellency information updating device to rewrite, in a case where the repellency control portion is activated to thereby succeed in repellency, data in the repellency information database device, on a basis thereof, and a communication portion to execute communication with the Internet, wherein the administrative server has a user-membership information database device to store membership information including a membership type to distinguish a user connected through the user terminal on whether he/she is a prospect customer considering to purchase the animal repelling device or a purchaser having purchased the animal repelling device, a user-personal information database device to store personal information on privacy of a user connected through the user terminal.

a program information database device to store information of a program to be embedded in a repellency control portion of the animal repelling device, a repellency information metadatabase device to store data of what has had an effect and data of what is worthwhile to try, stored by a repellency information database device of the animal repelling device, in a relationship with this animal repelling device, an Information-embedded diagram information database device to store information of an Information-embedded diagram given to the animal repelling device purchased or to be purchased by the user, a professionals-membership information database device to store membership information including a membership type of a professional connected through the professional terminal, a professionals-personal information database device to store personal information on privacy of a professional connected through the professional terminal, a user-membership information administrative portion to administer user-membership information and to store it in the user-membership information database device, a user-personal information administrative portion to administer user-personal information and to store it in the user-personal information database device, a program administrative portion to administer a program embedded in a repellency control portion of the animal repelling device purchased by the user as a program group in plurality being allowed to be embedded in this animal repelling device, an Information-embedded diagram information administrative portion to acquire, through the user terminal, information of an Information-embedded diagram given to the animal repelling device purchased or to be purchased by the user and to store it in the Information-embedded diagram information database device, a professionals-membership information administrative portion to administer professionals-membership information and to store it in the professionals-membership information database device, a professionals-personal information administrative portion to administer professionals-personal information and to store it in the professionals-personal information database device, an odor sensor detection information database device to store detection information of the odor sensor in plurality, an odor sensor detection information administrative portion to acquire detection information of the odor sensor in plurality and to store it in the odor sensor detection information database device, and a communication processing portion to execute communication with the Internet in order to make exchanges between the user terminal in plurality, the professional terminal in plurality, the information processing server, and the information disclosure server, wherein the information processing server has an information extraction portion to extract necessary information out of the user-membership information database device, the user-personal information database device, the program information database device, the repellency information metadatabase device, the Information-embedded diagram information database device, the professionals-membership information database device, the professionals-personal information database device, the odor sensor detection information database device, of the administrative server, an information elimination portion to eliminate personal information or information to be confidential, out of information extracted by the information extraction portion.

and an information processing portion to give processing to information obtained by excluding information eliminated by the information elimination portion out of information extracted by the information extraction portion, and wherein the information disclosure server has a disclosed-information database device to administer information generated by an information processing portion of the information processing server, for each plurality of levels, a membership type determination portion to determine what kind of membership type the user or the professional, requesting that the information disclosure server disclose information, belongs to, an information disclosure permission portion which permits, on a basis of a result determined by the membership type determination portion, the user or the professional to access information stored by the disclosed-information database device, and simultaneously discloses to the user, information for contacting the professional, in order to allow the user to ask advice of the professional, and a professionals-membership information updating portion to demand, in a case where the user selects information for contacting the professional, disclosed to the user by the information disclosure permission portion and decides to contact this professional, that a professionals-membership information administrative portion of the administrative server rewrite a membership type of this professional into one having a privilege of accessing information of this user, wherein the user terminal displays information disclosed by accessing the information disclosure server in response to a demand of the user, and simultaneously, modifies a program of the repellency control portion or rewrites data of what is worthwhile to try, registered in the repellency information database device, by accessing the animal repelling device used by this user, and wherein the professional terminal displays information disclosed by accessing the information disclosure server in response to a demand of the professional, and allows the user to contact the professional to ask advice thereof, as necessary, with reference to information displayed on the user terminal and allows, by information identical with that on the user terminal of the user being displayed on the professional terminal, the professional to respond with the advice to the user.

This allows a placement place of an animal repelling device to be changed to a more effective place.

A program group in plurality being administered by a program administrative portion of said administrative server includes a program to make, on an occasion of selecting, by referring to said repellency information database device, data of what is worthwhile to try, a random selection out of a plurality of the data of what is worthwhile to try, and a program to, in accordance with an order given in advance to a plurality of the data of what is worthwhile to try, select them sequentially.

This allows a program applied to have variation.

An animal repelling system comprising, further, a community formation server, wherein said information disclosure server has further a community guidance portion that shows, when said user accesses the information disclosure server through said user terminal, the user, together with information to be disclosed, a display allowing him/her to contact said professional or said users other than this user, to urge, thereby, the user to participate in a community formed by the community formation server, and wherein the community formation server has an exchange offer portion that urges the user to offer exchanges by acquiring information on presence of the professional and that on presence of the users other than this user from said administrative server and showing them, and that tells, on a basis of a matter that the user represents a will to offer exchanges that he/she wants to make exchanges with a specific other party, that effect to this specific other party, an offer acceptance portion that, when the exchange offer portion sends an exchange offer, tells, on a basis of a matter that the professional or user having received that offer has represented a will to accept it, a matter of accepting it, to an offerer, a talk room generation portion to generate, on a basis of a matter that the offer acceptance portion has received the offer and an acceptance thereof, a talk room allowing, in order for two parties to make exchanges through a chat, writing by the two parties to be browsed by each other, a talk room administrative portion to act, every time the user or professional participating in a talk room generated by the talk room generation portion writes onto the talk room, to allow this writing to be browsed by two parties, an exchange portion to operate, for a talk room generated by the talk room generation portion, not only a one-to-one exchange, through enlarging it to an exchange between three persons or more of the user or the professional but also exchanges between three persons or more, an evaluation-to-professionals portion where said user who makes an exchange with said professional evaluates the professional and scores him/her through this exchange, an interactive evaluation portion where the professional evaluates and scores the user, and a point-granting portion to evaluate the user or the professional for making an active exchange and grant him/her a point having a monetary value.

This allows opinions to be exchanged more widely and appropriate information to be collected.

Effect of Invention

As described above, the present invention provides an animal repelling system allowing an animal repelling device to be effectively used.

Additionally, it can also be, by being used to deter animals corresponding to endangered species from being out of an area where they are protected, made useful for protecting the animals.

BRIEF DESCRIPTION OF DRAWINGS

FIG. 1 A block diagram showing, in configuration, an animal repelling device according to an embodiment of the present invention FIG. 2 A sequence diagram showing how an animal repelling device according to an embodiment of the present invention works when repelling an animal FIG. 3 A sequence diagram showing that an animal repelling device according to an embodiment of the present invention is controlled through Internet FIG. 4 A diagram showing, in overall configuration, an animal repelling system according to an embodiment of the present invention, in an overview manner FIG. 5 A diagram showing, in internal configuration, an administrative server in an animal repelling system according to an embodiment of the present invention, in an overview manner FIG. 6 A diagram showing, in internal configuration, an information processing server in an animal repelling system according to an embodiment of the present invention, in an overview manner FIG. 7 A diagram showing, in internal configuration, an information disclosure server in an animal repelling system according to an embodiment of the present invention, in an overview manner FIG. 8 A diagram showing, in internal configuration, a community formation server in an animal repelling system according to an embodiment of the present invention, in an overview manner FIG. 9 A sequence diagram showing a procedural flow of how an information processing server processes information and an information disclosure server discloses information, in an animal repelling system according to an embodiment of the present invention FIG. 10 A sequence diagram showing a procedural flow of how a user proceeds with community formation by using the present system, in an animal repelling system according to an embodiment of the present invention

BEST MODE FOR CARRYING OUT THE INVENTION

A best mode for carrying out a system according to the present invention is described in detail, as follows. A state where a CPU (central processing unit) of a computer such as a server (server computer) reads in a computer program needed and works is expressed, when oo portion, ΔΔ device is referred to in the present description. Therefore, such "oo portion" or "ΔΔ device" is a component element of a product invention.

FIG. 1 is a block diagram showing, in configuration, an animal repelling device 10 according to an embodiment of the present invention. An infrared sensor 11 is a sensor to detect an animal such as a rat/mouse moving. It detects, when a living thing such as a rat/mouse moves, that. Then, other instruments, namely, an infrared camera 12, a sound collection microphone 18, and so on can be made to be activated with a trigger that the infrared sensor 11 detects some kind of animal moving. An odor sensor 15a, 15b, 15c, 15d, 15e, 15f as well can be used as a sensor to detect an animal such as a rat/mouse being present on a basis of body odor thereof. Since in a case where an odor sensor 15 is used and in a case where a dead body is left, the dead body emits odor, it can preclude a living rat/mouse moving from being detected, it is required to be removed.

The odor sensor 15a. 15b, 15c, 15d, 15e, 15f can be used to decide where to place an animal repelling device. It is because a urinary residue or a path trace cannot be visually recognized while a fecal residue can be visually recognized. It is, after the animal repelling device is placed, activated together with an infrared camera and an infrared sensor, and is useful for accurately determining where a rat/mouse is present. Additionally, a matter that no odor sensor is activated any more proves that 'no rat/mouse appears any more'. Even after the animal repelling device is placed, the odor sensor 15a, 15b, 15c, 15d, 15e, 15f is placed at a placement candidate place (movement candidate place) of an animal repelling device and data is acquired at such place points, and thereby, information for changing a placement place of an animal repelling device can also be acquired.

A shockwave generator 13 repels a rat/mouse and so on by generating a shockwave intended to surprise an animal or generating an ultrasonic wave. It is desirable to use an ultrasonic wave and a shockwave in combination. Although volume of sound (regardless of whether in a human audible region or not) is a design matter, it can be made switchable by preparing a generation program for several patterns of sound. It is desirable for one establishment (such as an eatery establishment) to have, for example, about 30 shockwave generators placed. The shockwave is desirably 105 db/m in sound pressure. Additionally, sonic wave can be desirably varied (right/left) automatically.

A strobe flashlight 14 intensely gives out light whose color is detested by an animal such as a rat/mouse. A round-shape stage-illumination light commercially sold with a name of Stage Evolution (registered trademark of Sound House) can be used. Although a rat/mouse cannot discern color in some theory, it is thought that the rat/mouse feels light wavelength with its eye or its body surface, and it has turned out, through an experiment by the Inventor, that green or red is a color a rat/mouse detests. A color-generating program such as wavelength difference, intensity difference, flicker interval is prepared in a couple of numbers, and thereby, switchable ones are allowed to be made.

A strobe light and a sound work together with each other and thereby, give a rat/mouse greater fear to make it flee from an instrument placement place. Since a rat/mouse has a strong sense of territory, it moves from the place to another place, and then, is chased off or killed by another rat/mouse. Additionally, a rat/mouse starves to death when it cannot eat for about three days. As a result, this instrument is used, and then, the rat/mouse dies, not in the placement place but after getting out of it, and needs not have its dead body disposed of. Additionally, a matter such as getting infested with maggots, giving off odors, generating mold germs because the dead body gets, in a narrow place, putrefied without being found can be prevented.

An infrared camera 12 is a camera that can capture a video image of an object moving in darkness. It may also be made so that it can record a video image and is provided with a sound collection microphone 18 which can simultaneously record sound. Additionally, it can be equipped with a motor to be allowed to, as an image-capturing object moves, track this and capture an image thereof. It is allowed, by having a motor attached and keeping track, to widen its repellency area. It is configured to store a video image on an occasion of finding an animal, a video image of the animal running away, and a video image of being driven away so that a user can watch them, and evidence of repelling rats/mice can be, thereby, obtained and the user can confirm an effect by placing an animal repelling device. Since rats/mice have territories, they are, when getting away from such a placement site to another place, attacked by rats/mice present there and are killed or injured. Therefore, since they need not be killed in a place where an animal repelling device is placed, no necessity occurs to dispose of rats/mice being dead bodies.

An animal feature analysis device 19 is a device to, by analyzing a video image captured by an infrared camera 12 and sound voice data acquired by a sound collection microphone 18, analyze and specify features of an animal relevant. On this occasion, it is desirable to specify in detail, when the animal is a rat/mouse, what kind of rat/mouse it is, and when it is a masked palm civet, what kind of masked palm civet, but even if it cannot be specified in detail, an animal repelling device 10 according to the present invention can be activated when features necessary for relating the animal to what kind of shockwave and strobe light to desirably use to repel it (drive it away) are obtained.

A repellency information database device 20 has 'features of an animal', 'wavelength/sound volume of shockwaves and wavelength/intensity of light, suitable for repelling a relevant animal', 'being data of what had an effect formerly or data of what is worthwhile to try' stored in relation with each other. In a case where an animal is detected, a shockwave generator 13 and a strobe flashlight 14 are, by dint of action of a repellency control portion 16 described later, activated with wavelength and intensity based on data of what had an effect formerly, in light of features of an animal, analyzed and obtained by the animal feature analysis device 19 and with reference to a repellency information database device 20. Then, an infrared camera 12 and a sound collection microphone 18 continues to be activated to detect this animal having gotten away (been driven away). On that occasion, a repellency record registration device 21 appends this data (a fact that an animal having these features has been successfully repelled with shockwave/light in this wavelength/intensity) to the afore-mentioned repellency information database device 20.

In a case where although the shockwave generator 13 and the strobe flashlight 14 are activated, repellency cannot make repellency through being thereafter monitored by an infrared camera and a sound collection microphone, the repellency control portion 16 activates, with reference to the repellency information database device 20 again and with reference to data of what is worthwhile to try, the shockwave generator 13 and the strobe flashlight 14. Then, references to 'data of what is worthwhile to try' are sequentially made repetitiously until a relevant animal is successfully repelled, and in a case where the repellency is successfully made, a repellency information updating device registers for updates, as information of combination of 'features of an animal', 'wavelength/sound volume of shockwaves and wavelength/intensity of light, suitable for repelling a relevant animal' and 'being data of what had an effect formerly', a fact that the repellency information updating device 22 has succeeded in repelling the relevant animal.

A repellency control portion 16 is a control portion to activate, on a basis of a matter that an odor sensor 15 and/or an infrared sensor 11 detects an animal, a shockwave generator 13, an infrared camera 12, and a strobe flashlight 14. It is made to have a CPU (central processing unit) such as a microchip and configured to have its program allowed to be rewritten and switched by its outside. It can, through an administrative server 100 described later, have its program modified by a user through his/her user terminal 1.

A communication portion 17 is a portion to carry out communication with Internet. The communication portion 17 is connected with an administrative server 100 described later and also, through the administrative server 100, connected with a user terminal 1 (smartphone, PC, tablet computer) and is indispensable for a user to know an effect of an animal repelling device 10 through an information disclosure server 300 and to switch action thereof.

Nutrias and the like, which are relative to rats/mice, are known to come out in a farm to inflict damage on rice and vegetables. Since a rat/mouse is smart, it can never be caught with a trap device once it gets caught therewith. Since an animal repelling device 10 according to the present invention can be very variously switched in action, the animal repelling device 10 can be used even outdoor when it is configured to be waterproof. It is desired to be used especially at night since rats/mice are nocturnal. It has been certified as effective even against masked palm civets and other mammals (such as deer, muntjacs, raccoon dogs).

FIG. 2 is a sequence diagram showing how an animal repelling device 10 according to an embodiment of the present invention works when repelling an animal. When an odor sensor 15 and/or infrared sensor 11 detects an animal being present, a signal (animal detection signal) thereof is sent to a repellency control portion 16 and a communication portion 17. When a repellency control portion 16 receives an animal detection signal, the repellency control portion 16 sends a strobe flashlight 14 a signal of lights-activation instruction while sends a shockwave generator 13 a signal of sonic wave (shockwave)-generation instruction. Further, it activates an infrared camera 12 simultaneously. A signal showing that the strobe flashlight 14 is activated, a signal that a shockwave generator 13 is activated, and a signal of video images (sound voice) of the infrared camera are sent to an administrative server 100 through a communication portion 17. Additionally, information of a repellency information database device 20 is sent to a repellency information metadatabase device 142 of the administrative server 100 while detection information of an odor sensor 15 is sent to an odor sensor detection information database device 145 through an odor sensor detection information administrative portion 127 of the administrative server 100.

It is allowable to constantly capture images with an infrared camera and send them to the administrative server 100. It is also allowable to activate, when a user wants to see them through a terminal of his/her smartphone or the like, the infrared camera.

FIG. 3 is a sequence diagram showing that an animal repelling device 10 according to an embodiment of the present invention is controlled through Internet. The animal repelling device 10 can be made to have its action program prepared in plurality in advance and rewritten by a user. It sends, as shown in FIG. 3, a signal of control program rewriting instruction to an administrative server by a user terminal. Then, an administrative server 100 carries out a personal identification processing, confirms that this instruction is surely made by a user himself/herself, and carries out a program rewriting processing. That is, it gives a repellency control portion a rewriting instruction through a communication portion, while sends it a rewriting program (or sends it information on where the program is so that that is accessed). The repellency control portion receives the instruction and modifies its program (downloads and installs it, if necessary). The repellency control portion gives the administrative server completion notice when it has its program modified and installation thereof completed. Then, the administrative server gives the user terminal the completion notice.

Such a program modification can be made by a user himself/herself in accordance with changes of his/her environment. Additionally, it can be made on a basis of advice by a professional.

A new program for rewriting one can be prepared on a basis of incessant researches by a professional. The administrative server 100 has its program information database device 141 store a program in plurality and has its program administrative portion 111 administer storage processing or the like thereof.

FIG. 4 is a diagram showing, in overall configuration, an animal repelling system according to an embodiment of the present invention, in an overview manner. What is depicted in a longitudinal oval shape a little rightward to center is an internet network. Through the internet network, a user terminal 1 in plurality, a professional terminal 51 in plurality, an administrative server 100, an information processing server 200, an information disclosure server 300, a community formation server 400 are connected with each other. The user terminal 1 and the professional terminal 51 are depicted in assuming a smartphone here. A tablet computer, a laptop computer, or the like may be used. An Information-embedded diagram (e.g., QR code (registered trademark)) is given to an animal repelling device 10 depicted in FIG. 4 and is used as identification information to clarify a spec (specification) of this device. In the Information-embedded diagram, information for accessing information on what a computer program used by this animal repelling device at a time of shipment is like is embedded, and such a configuration as a user can access the information by capturing, for example, an image thereof with a camera of a smartphone is made. The user can access a certain degree of information even without carrying out membership registration, but it is desirable to restrict, for each membership type (in accordance with a difference such as a prospect customer, a visitor, a customer during a use period, or a customer having its purchase contract, rental contract, or lease contact concluded), information that can be accessed, in order to allow even further detailed information to be accessed as the present system such as an administrative server is used more deeply after a membership registration is completed. A difference is provided in such a manner that a prospect customer or a visitor customer is shown data showing past repellency performances, a moving image obtained by capturing images of how a real animal is repelled, and/or a graph as statistical information showing performances for past several months while a customer having made a purchase and making use can be shown a moving image or a graph, showing how a system of this user him/herself works.

A professional sends a system various information for effectively using an animal repelling device by using a professional terminal 51. Information provided by the professional can be known by a user through an information disclosure server 300. An administrative server 100 deals with a membership registration, a membership type, membership information, personal information and so on for each of the professionals and users, protects them against attacks from outside (e.g., by a hacker), and makes such administration that a person rightly authorized to access information can access righteous information. An information processing server 200 processes information fed by a professional or information on how an animal repelling device of a user him/herself is currently used, and makes it easy for a wide variety of and a lot of users to access and use. An information disclosure server 300 is a server to disclose, when a user accesses information on a professional or a big data provided by a lot of users, information on the professional or information on the big data to the user. A community formation server 400 is a server to help a specific professional and a specific user make an exchange with each other (e.g., participate in an instrument installation work experience session of an animal repelling device, guiding a household for installing instruments, etc.).

In FIG. 4, each odor sensor 15*a*, 15*b*, 15*c*, 15*d*, 15*e*, 15*f* is depicted as directly connected with an internet network to be thereby connected with an animal repelling device 10, an administrative server 100, an information processing server 200, an information disclosure server 300, and a community formation server 400, but may be configured to be connected with the internet network through a nearest animal repelling device 10. Additionally, although it is allowable that in order to select a placement place of an animal repelling device, the odor sensors 15*a*, 15*b*, 15*c*, 15*d*. 15*e*, 15*f* are placed in a candidate place and used only for the purpose of obtaining data for a predetermined period, they can be, by continuing to be placed even thereafter, made to be useful for proposing that the placement place of an animal repelling device be changed. In addition, it is allowable that they can continue to be used as a device for checking on an effect by the animal repelling device.

Although not depicted in FIG. 4, some printing businesses print on an instrument surface of an animal repelling device or a user's manual thereof, and print an Information-embedded diagram on an instrument. Regardless of whether in a distribution process, in a retail shop, or in a user's placement place, the Information-embedded diagram printed on an instrument is read in and is made accessible to this trace system. A configuration to allow, by reading in this Information-embedded diagram, demonstration information and/or demonstration moving images to be accessed can be made, in a distribution process.

FIG. 5 is a diagram showing, in internal configuration, an administrative server 100 in an animal repelling system according to an embodiment of the present invention, in an overview manner. The administrative server 100 has a user-membership information administrative portion 105 to register and administer user membership information, a user-membership information database device 130 to retain data of the user membership information, a user-personal information administrative portion 110 to register and administer user personal information, a user-personal information database device 140 to retain data of user personal information, a program administrative portion 111 to administer a program embedded in an instrument of an animal repelling device owned by a user, a program information database device 141 to store information of a program to be embedded in an instrument of the animal repelling device, an Information-embedded diagram information administrative portion 115 to administer information of an Information-embedded diagram given to the animal repelling device or to a user's manual thereof, an Information-embedded diagram information database device 150 to retain information of an Information-embedded diagram, a professionals-membership information administrative portion 120 to register and administer professionals-membership information, a professionals-membership information database device 155 to retain data of professionals-membership information, a professionals-personal information administrative portion 125 to register and administer personal information on privacy of a professional, a professionals-personal information database device 160 to retain professionals-personal information, an odor sensor detection information database device 145 to store odor sensor detection information, an odor sensor detection information administrative portion 127 to administer detection information of an odor sensor, a repellency information metadatabase device 142 to store information on animal repellency performance record and data of what is worthwhile to try, stored in a repellency information database device of each animal repelling device, by linking them to a specification of this animal repellency device and/or information of a placement place, and a communication processing portion 170 to carry out communication through connection with an internet network.

Since an administrative server 100 has a repellency information metadatabase device 142, an animal repelling device 10 placed in plurality at various places gets together one data of performance records of having succeeded in animal repellency after another in a repellency information metadatabase device 142 of the administrative server 100. Then, a repellency information updating device 22 of the animal repelling device 10 can, by accessing the repellency information metadatabase device 142 of the administrative server 100 and referring to performance record data of another animal repelling device 10, update its own repellency information database device 20. This expands 'data of what is worthwhile to try' of the repellency information database device 20, and in a case where in this animal repelling device 10, animal repellency is not successful in one time, choices on an occasion of trying shockwaves and/or strobe flashes of other frequencies/intensity can be increased.

A user accesses, by scanning an Information-embedded diagram (e.g., quadratic barcode) printed or attached outside an instrument of an animal repelling device he/she has purchased, an administrative server and make user registration, and thereby completes works of linkage to an instrument he/she uses.

Although a counterpart of a communication processing portion 170 is also present in another server, it is left out for depiction in FIG. 6, FIG. 7, FIG. 8.

FIG. 6 is a diagram showing, in internal configuration, an information processing server 200 in an animal repelling system according to an embodiment of the present invention, in an overview manner. The information processing server 200 has an information extraction portion 220 to extract information (a user or) a professional provides, an information elimination portion 240 to eliminate personal information and confidential information out of information obtained, and an information processing portion 260 to organize information as disclosable. Since information provided by a professional or a user is information to be disclosed by an information disclosure server 300 to unspecified numerous people, it should get freed of unnecessary matters, from a view of protecting privacy and protecting confidential information. Additionally, since a professional in plurality provides information on a placement place of his/her own instrument, a placement method thereof, and so on, he/she is likely to make modes thereof have unevenness. By adjusting such a matter, a product easy for a user to use is obtained.

FIG. 7 is a diagram showing, in internal configuration, an information disclosure server 300 in an animal repelling system according to an embodiment of the present invention, in an overview manner. Information adjusted by an information processing server 200 to a state of being disclosable is accumulated in a disclosed-information database device 320. The disclosed-information database device 320 classifies and retains information allowed to be accessed, for each type of each member. The information disclosure server 300 has a membership type determination portion 340 to determine, when a user member (or a professional member) attempts to access a disclosed-information database device 320, a membership type of the member, and an information disclosure permission portion 360 to permit information disclosure for information falling within a scope permitted for the membership type. This allows information suitable for each membership type to be accessed. This membership type can be decided in accordance with, for example, difference in contract form of a user member and amount of member fees paid out periodically. Additionally, the membership type can be decided on a basis of a performance record of exchanges with professionals. Furthermore, the membership type can, after giving a quiz, be decided on a basis of a correct answer rate thereof. The membership type can also be decided on a basis of a performance record of how much to have mastered a knowledge provided by a professional. The membership type is part of membership information, which is stored in a user-membership information database device 130 and a professionals-membership information database device 155 through a user-membership information administrative portion 105 of an administrative server 100 and a professionals-membership information administrative portion 120 thereof.

Information accumulated in an information disclosure server 300 and to be disclosed to users includes even information on professionals. Information on what kind of professional is registered and what kind of beneficial information the professional provides is disclosed to each of the users. It is desirable that in a case where a user having gotten in contact with that information wants to exchange information with this professional or seeks an opinion of this professional, such a user devolves, to that professional for a given period, a privilege of accessing information of an animal repelling device he/she owns (uses). In a case where a user wants such a matter, the user pushes a button saying. "I permit this professional, for one month, to access information of my animal repelling device," which is provided beside a display showing information on the professional, and thereby, a professionals-membership information updating portion 380 of the information disclosure server 300 works to act on a professionals-membership information administrative portion 120 of an administrative server 100 so that a membership type, part of membership information of the professional in a professionals-membership information database device 155, is rewritten to allow information the user can see, to be accessed for one month. Additionally, a community formation server 400 described later works and thereby, exchanges between the user and the professional are allowed to be made by such means as exchanges of mails, chats, and moving images, and exchanges of files.

In order to realize such a matter as 'one-to-one exchanges between a professional and a user', 'one-to-one exchanges between users', 'exchanges between a professional, and users in plurality', and 'exchanges between users in plurality', a community guidance portion 390 of an information disclosure server 300 has a functionality of making a display for the information disclosure server 300 to guide professionals or users. It urges, by displaying "For exchanges with other users or a professional, come from here!", or displaying "For exchanges with this person, come from here" while representing profiles of users or professionals who hope exchanges, that a community generated and operated by a community formation server 400 be participated in.

FIG. 8 is a diagram showing, in internal configuration, a community formation server 400 in an animal repelling system according to an embodiment of the present invention, in an overview manner. The community server 400 has an exchange offer portion 420 to process a matter that one member (e.g., user) offers to make exchanges in such a manner as asking a specific professional a piece of advice, asking him/her a question, and requesting him/her to show instrument installation works, an offer acceptance portion 440 by which a professional having received an exchange offer executes a processing of accepting it, an exchange portion 460 to process exchanges such as chats, voice calls, TV calls, and mails, a talk room generation portion 465 to generate a talk room in a one-to-one way, or between a user in plurality and a professional, a talk room administrative portion 470 to administer the talk room, an evaluation-to-professionals portion 475 by which a user evaluates the professional on a basis of a record of exchanges, an interactive evaluation portion 485 to execute an interactive evaluation between a user and a profession, and a point-granting portion 490 to grant, on a basis of results of the evaluations, points having monetary values.

The talk room generation portion 465 has a functionality of generating a group room not only to carry out a one-to-one exchange but also for a plurality of persons to simultaneously carry out exchanges, and enables a person wanting to create a group out of professionals or users, to make him/herself a chairperson to make a group. The professionals or users can, by either participating in a group another person has made or creating a group of his/her own, carry out exchanges with a plurality of persons.

FIG. 9 is a sequence diagram showing a procedural flow of how an information processing server 200 processes information and an information disclosure server 300 discloses information, in an animal repelling system according to an embodiment of the present invention. In this sequence diagram, time flows from top to bottom. An information processing server demands various information from an administrative server. Then, the administrative server passes over various information to the information processing server. When the information processing server receives various information, it extracts, from the information, necessary information, and eliminates personal information and confidential information. Thereafter, it is adjusted as information to be disclosed (information processing). Information having been processed by the information processing server is passed over to an information disclosure server and stored in a database device.

When the information disclosure server 300 is accessed by a user terminal or a professional terminal, the information disclosure server 300 determines, by referring to a user-membership information database device 130 of an administrative server 100 and a professionals-membership information database device 155 thereof, a membership type of such a member. Then, information adapted to a type of the member is disclosed. When that information is disclosed, the information is represented on the user terminal or the professional terminal.

FIG. 10 is a sequence diagram showing a procedural flow of how a user proceeds with community formation by using the present system, in an animal repelling system according to an embodiment of the present invention. For example, when a user 1 offers an exchange to a user 2, an exchange offer is processed through a community formation server, and sent to the user 2. In a case where the user 2 accepts the offer, such a matter is sent through a community formation server 400, and an exchange is accepted. Then, as the community formation server goes on preparation, exchanges such as chat, voice call, video call are carried out between the user 1 and user 2. When satisfied with exchanges with an exchange partner, each member carries out interactive evaluation, and as a positive evaluation is made, an operating side grants a point. Here, exchanges between users are mentioned, but exchanges between a user and a professional are also carried out likewise.

A professional offers formation of a talk room to numerous users, and the community formation server responds thereto and forms a talk room. The talk room can be held in such a manner as the user 1 and the user 2 participate therein. In the talk room formed, the professional can, on a basis of his/her own experience and knowledge, carry out coaching, counseling, guidance, advice, and consultancy, and hold, additionally, an experience session for experiencing works of installing instruments and make an appeal to participate therein. For example, it can be expected that a user not accustomed to rats/mice gets into contact with life states of the rats/mice through participation in actual instrument installation works, or the like, to avoid unnecessarily killing living things. On a basis of such an exchange performance record, a professional can be evaluated to grant a point.

EMBODIMENT EXAMPLE

A disclosed-information database device 320 of an information disclosure server 300 includes text data, static image data, moving image data, and so on. For example, for a member data analysis and a matter with a large number of accesses, proposals can be made on the matter by using text data, static image data, moving image data.

A community formation server 400 can, in a case where an experience session for experiencing works of installing instruments is held, capture moving images of that occasion, store the moving images in a disclosed-information database device 320, and allow them to be accessed by a predetermined member.

Exchanges for forming a community by the community formation server 400 is desirably carried out in a manner that people actually face each other. It is allowable to carry out part of exchanges between people by using a remote meeting through Web.

Although an animal repelling system according to the present invention has been, as described above, described by showing specific embodiments, the present invention shall not be limited to those. A person skilled in the art can, within a scope that does not deviate from essentials of the present invention, add various modifications/improvements to a configuration and a functionality, of server computers in the above-mentioned embodiments.

Additionally, although the embodiments are provided with four server computers, the server computers can be increased/decreased in number by appropriately dividing or integrating functionalities they have.

INDUSTRIAL APPLICABILITY

A system according to the present invention is a system that can be widely used in such types of businesses as animals need to be repelled or protected, as in food-serving businesses, agricultural industries, forestry industries, and livestock industries.

REFERENCE SIGNS LIST

1 User terminal
10 Animal repelling device
11 Infrared sensor
12 Infrared camera
13 Shockwave generator
14 Strobe flashlight
15a, 15b, 15c, 15d, 15e, 15f Odor sensor
16 Repellency control portion
17 Communication portion
18 Sound collection microphone
19 Animal feature analysis device
20 Repellency information database device
21 Repellency record registration device
22 Repellency information updating device
51 Professional terminal
100 Administrative server
105 User-membership information administrative portion
110 User-personal information administrative portion
111 Program administrative portion
115 Information-embedded diagram information administrative portion
120 Professionals-membership information administrative portion
125 Professionals-personal information administrative portion
127 Odor sensor detection information administrative portion
130 User-membership information database device
140 User-personal information database device
141 Program information database device
142 Repellency information metadatabase device
145 Odor sensor detection information database device
150 Information-embedded diagram information database device
155 Professionals-membership information database device
160 Professionals-personal information database device
170 Communication processing portion
200 Information processing server
220 Information extraction portion
240 Information elimination portion
260 Information processing portion
300 Information disclosure server
320 Disclosed-information database device
340 Membership type determination portion
360 Information disclosure permission portion
380 Professionals-membership information updating portion
390 Community guidance portion
400 Community formation server
420 Exchange offer portion
440 Offer acceptance portion
460 Exchange portion
465 Talk room generation portion
470 Talk room administrative portion
475 Evaluation-to-professionals portion
485 Interactive evaluation portion
490 Point-granting portion

The invention claimed is:

1. An animal repelling system made by having, through Internet, an animal repelling device in plurality, a user terminal in plurality, a professional terminal in plurality, an administrative server, an information processing server, and an information disclosure server, connected with each other, wherein the animal repelling device
has
an infrared sensor to detect a moving animal,
an infrared camera which is activated, as a trigger, by the infrared sensor detecting the moving animal, and can take an image of the animal moving in darkness, a sound collection microphone to record a sound given by the animal, an animal feature analysis device to specify, by analyzing imaging data of the infrared camera and sound voice data of the sound collection microphone, features of the animal, including appearance, size, sound voice, motion of the animal,
a repellency information database device to relate features of the animal as a result of the animal feature analysis device having made analysis and specification to shockwave data including wavelengths/sound volume of shockwaves suitable for repelling the animal, and light data including frequencies/light amount of light suitable therefor, and store them, and to store them as information including data of what has had an effect and data of what is worthwhile to try, a shockwave generator to generate, by referring to the repellency information database device on a basis of features of the animal, analyzed and specified by the animal feature analysis device, a shockwave adjusted in wavelength and sound volume on a basis of data of what has had an effect,
a strobe flashlight to generate, by referring to the repellency information database device on the basis of features of the animal, analyzed and specified by the animal feature analysis device, light adjusted in frequency and light amount on a basis of data of what has had an effect, a repellency record registration device to store, by analyzing the imaging data of the infrared camera and the sound voice data acquired through the sound collection microphone, which are just after the shockwave generator and the strobe flashlight are activated, and determining whether the animal is repelled, a result thereof in the repellency information database device in a case where the animal is repelled, a repellency control portion to generate, by analyzing the imaging data of the infrared camera and the sound voice data acquired through the sound collection microphone, which are just after the shockwave generator and the strobe flashlight are activated, and determining whether the animal is repelled, and by referring to the repellency information database device on a basis of a result thereof in a case where the animal is not repelled, the shockwave adjusted in the wavelength and the sound volume in the shockwave generator on a basis of data of what is worthwhile to try, and simultaneously to generate light emitted by the strobe flashlight and adjusted in the frequency and the light amount, a repellency information updating device to rewrite, in a case where the repellency control portion is activated to thereby succeed in repellency, data in the repellency information database device, on a basis thereof, and a communication portion to execute communication with the Internet, wherein the administrative server has a user-membership information database device to store membership information including a membership type to distinguish a user connected through the user terminal on whether he/she is a prospect customer considering to purchase the animal repelling device or a purchaser having purchased the animal repelling device, a user-personal information database device to store personal information on privacy of a user connected through the user terminal, a program information database device to store information of a program to be embedded in a repellency control portion of the animal repelling device, a repellency information metadatabase device to store data of what has had an effect and data of what is worthwhile to try, stored by the repellency information database device of the animal repelling device, in a relationship with this animal repelling device, an information-embedded diagram information database device to store information of an Information-embedded diagram given to the animal repelling device purchased or to be purchased by the user, a professionals-membership information database device to store the membership information including a membership type of a professional connected through the professional terminal, a professionals-personal information database device to store personal information on privacy of the professional connected through the professional terminal, a user-membership information administrative portion to administer user-membership information and to store it in the user-membership information database device, a user-personal information administrative portion to administer user-personal information and to store it in the user-personal information database device, a program administrative portion to administer a program embedded in a repellency control portion of the animal repelling device purchased by the user as a program group in plurality being allowed to be embedded in this animal repelling device, the Information-embedded diagram information administrative portion to acquire, through the user terminal, information of an Information-embedded diagram given to the animal repelling device purchased or to be purchased by the user and to store it in the Information-embedded diagram information database device, a professionals-membership information administrative portion to administer professionals-membership information and to store it in the professionals-membership information database device, a professionals-personal information administrative portion to administer professionals-personal information and to store it in the professionals-personal information database device, and a communication processing portion to execute communication with the Internet in order to make exchanges between the user terminal in plurality, the professional terminal in plurality, the information processing server, and the information disclosure server, wherein the information processing server has an information extraction portion to extract necessary information out of the user-membership information database device, the user-personal information database device, the program information database device, the repellency information metadatabase device, the Information-embedded diagram information database device, the professionals-membership information database device, the professionals-personal information database device, of the administrative server, an information elimination portion to eliminate personal information or information to be confidential, out of information extracted by the information extraction portion, and an information processing portion to give processing to information obtained by excluding information eliminated by the information elimination portion out of information extracted by the information extraction portion, wherein the information disclosure server has a disclosed-information database device to administer information generated by an information processing portion of the information processing server, for each plurality of levels, a membership type determination portion to determine what kind of membership type the user or the professional, requesting that the information disclosure server disclose information, belongs to, an information disclosure permission portion which permits, on a basis of a result determined by the membership type determination portion, the user or the professional to access information stored by the disclosed-information database device, and simultaneously discloses to the user, information for contacting the professional, in order to allow the user to ask advice of the professional, and a professionals-membership information updating portion to demand, in a case where the user selects information for contacting the professional, disclosed to the user by the information disclosure permission portion and decides to contact this professional, that a professionals-membership information administrative portion of the administrative server rewrite a membership type of this professional into one having a privilege of accessing information of this user, wherein the user terminal displays information disclosed by accessing the information disclosure server in response to a demand of the user, and simultaneously, modifies a program of the repellency control portion or rewrites data of what is worthwhile to try, registered in the repellency information database device, by accessing the animal repelling device used by this user, and wherein the professional terminal displays information disclosed by accessing the information disclosure server in response to a demand of the professional, and allows the user to contact the professional to ask advice thereof, as necessary, with reference to information displayed on the user terminal and allows, by information identical with that on the user terminal of the user being displayed on the professional terminal, the professional to respond with the advice to the user.

2. An animal repelling system according to claim 1 further provided with an odor sensor in plurality being placed in a placement candidate place of an animal repelling device, which can be a candidate for placing the animal repelling device, and having it connected with said administrative server through Internet, wherein the administrative server further has an odor sensor detection information database device to store detection information of the odor sensor in plurality, and an odor sensor detection information administrative portion to acquire detection information of the odor sensor in plurality and to store it in the odor sensor detection information database device, wherein an information extraction portion of said information processing server extracts necessary information also out of the odor sensor detection information database device, and wherein said professional terminal displays, when displaying information disclosed by accessing said information disclosure server in response to a demand of said professional, information including odor sensor detection information and allows said user to contact the professional to ask advice thereof, as necessary, with reference to information displayed on said user terminal and allows, by information identical with that on the user terminal of the user being displayed on the professional terminal, the professional to respond with the advice including a proposal of changing a placement place of the animal repelling device to the user.

3. An animal repelling system according to claim 1, wherein a program group in plurality being administered by a program administrative portion of said administrative server includes a program to make, on an occasion of selecting, by referring to said repellency information database device, data of what is worthwhile to try, a random selection out of a plurality of the data of what is worthwhile to try, and a program to, in accordance with an order given in advance to a plurality of the data of what is worthwhile to try, select them sequentially.

4. An animal repelling system according to claim 1 comprising, further, a community formation server, wherein said information disclosure server has further a community guidance portion that shows, when said user accesses the information disclosure server through said user terminal, the user, together with information to be disclosed, a display allowing him/her to contact said professional or said users other than this user, to urge, thereby, the user to participate in a community formed by the community formation server, and wherein the community formation server has an exchange offer portion that urges the user to offer exchanges by acquiring information on presence of the professional and that on presence of the users other than this user from said administrative server and showing them, and that tells, on a basis of a matter that the user represents a will to offer exchanges that he/she wants to make exchanges with a specific other party, that effect to this specific other party, an offer acceptance portion that, when the exchange offer portion sends an exchange offer, tells, on a basis of a matter that the professional or user having received that offer has represented a will to accept it, a matter of accepting it, to an offerer, a talk room generation portion to generate, on a basis of a matter that the offer acceptance portion has received the offer and an acceptance thereof, a talk room allowing, in order for two parties to make exchanges through a chat, writing by the two parties to be browsed by each other, a talk room administrative portion to act, every time the user or professional participating in a talk room generated by the talk room generation portion writes onto the talk room, to allow this writing to be browsed by two parties, an exchange portion to operate, for a talk room generated by the talk room generation portion, not only a one-to-one exchange, through enlarging it to an exchange between three persons or more of the user or the professional but also exchanges between three persons or more, an evaluation-to-professionals portion where said user who makes an exchange with said professional evaluates the professional and scores him/her through this exchange, an interactive evaluation portion where the professional evaluates and scores the user, and a point-granting portion to evaluate the user or the professional for making an active exchange and grant him/her a point having a monetary value.

* * * * *